(12) United States Patent
Bealkowski et al.

(10) Patent No.: US 6,601,147 B1
(45) Date of Patent: Jul. 29, 2003

(54) COMPUTER SYSTEM AND METHOD FOR MAINTAINING AN INTEGRATED SHARED BUFFER MEMORY IN A GROUP OF INTERCONNECTED HOSTS

(75) Inventors: Richard Bealkowski, Redmond, WA (US); Patrick Maurice Bland, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,891

(22) Filed: Mar. 31, 1999

(51) Int. Cl.$^7$ ............................................. G06F 13/00
(52) U.S. Cl. ........................ 711/147; 711/124; 711/141; 711/121; 711/130
(58) Field of Search ................. 711/119, 121, 711/130, 147, 148, 153, 173, 141, 124

(56) References Cited

U.S. PATENT DOCUMENTS

| | | | | |
|---|---|---|---|---|
| 3,771,137 A | * | 11/1973 | Barner et al. ............... | 711/120 |
| 5,815,167 A | * | 9/1998 | Muthal et al. ............... | 345/512 |
| 5,872,998 A | * | 2/1999 | Chee ............................ | 711/147 |
| 6,038,642 A | * | 3/2000 | Arimilli et al. ............. | 711/130 |
| 6,092,157 A | * | 7/2000 | Suzuki ........................ | 711/147 |
| 6,115,761 A | * | 9/2000 | Daniel et al. ................ | 711/147 |

\* cited by examiner

*Primary Examiner*—Glenn Gossage
(74) *Attorney, Agent, or Firm*—Bracewell&Patterson,LLP

(57) ABSTRACT

A computer system with a shared-buffer memory includes a plurality of interconnected host systems. Each of the host systems includes system random access memory, with a portion of the system random access memory defined as shared-buffer memory. A system memory controller determines if the host has updated the shared-buffer memory, and if so, signals that the shared-buffer memory has been updated. This signal is accomplished by initiating a PCI Special Cycle which indicates the location and length in the shared-buffer of the update. A buffer control and interconnect device receives the signal from the system memory controller that the shared-buffer memory has been updated, reads the update from the shared-buffer memory, and exports the update. The exported update is received at the buffer control and interconnect device of each of the other host systems. The receiving buffer control and interconnect device writes the update to its shared-buffer memory.

23 Claims, 3 Drawing Sheets

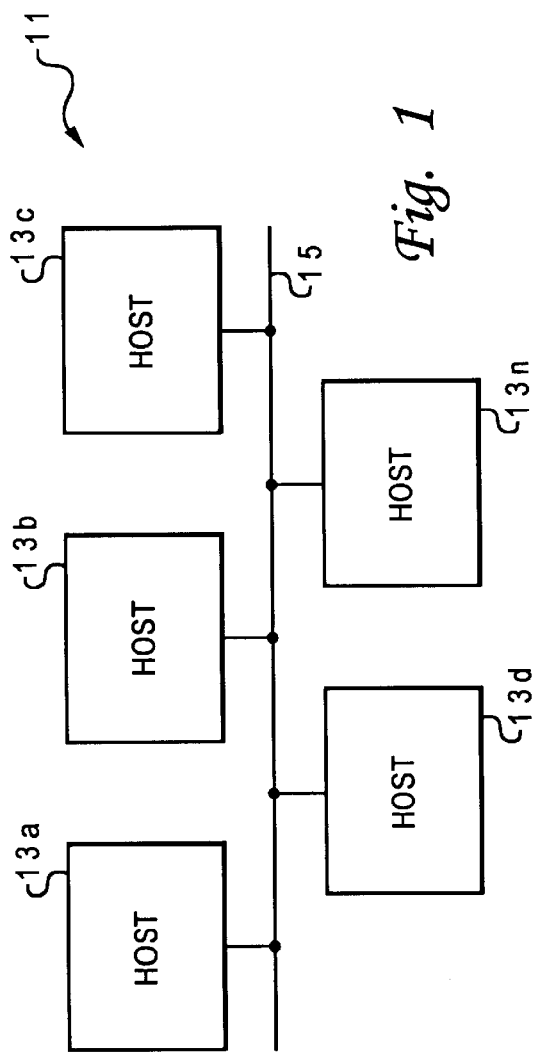
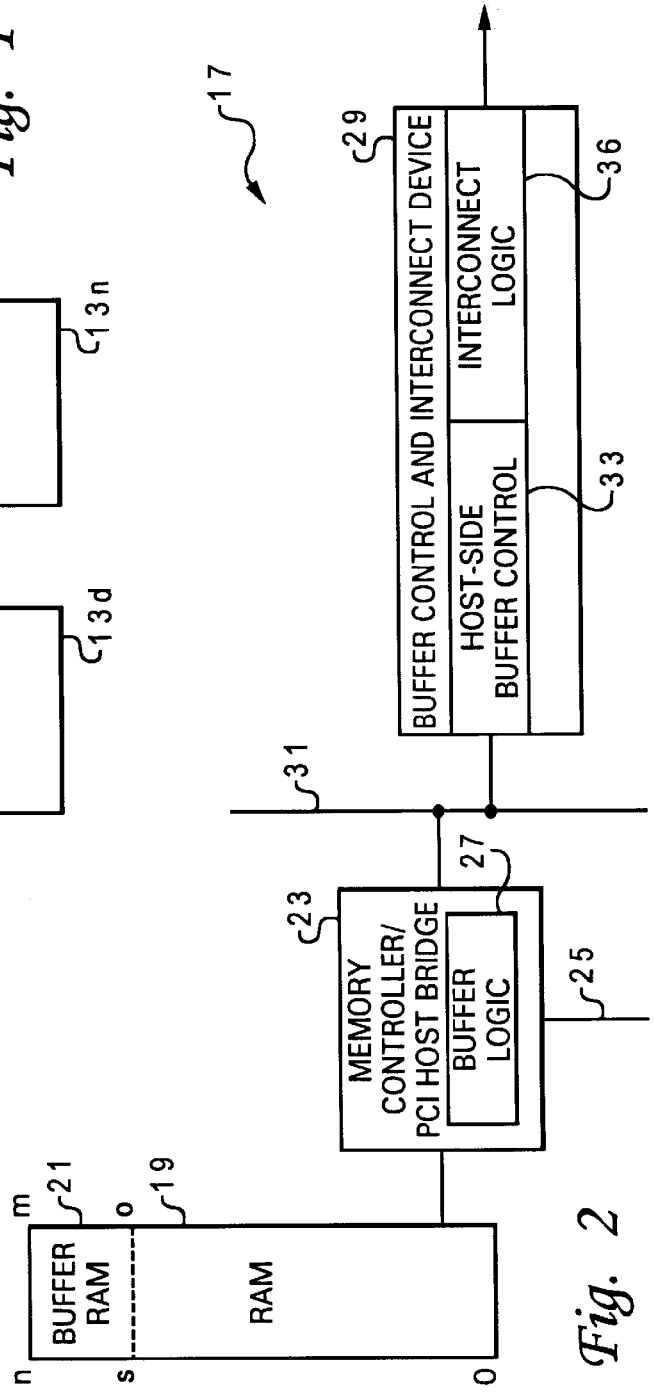

COMPUTER SYSTEM AND METHOD FOR MAINTAINING AN INTEGRATED SHARED BUFFER MEMORY IN A GROUP OF INTERCONNECTED HOSTS

BACKGROUND OF THE INVENTION

1. Technical Field

The present invention relates generally to interconnected or clustered computer systems, and more particularly to a method of and system for maintaining an integrated shared-buffer memory in a system of interconnected or clustered computers, and still more particularly to a computer system in which shared-buffer memory is maintained in system random access memory (RAM).

2. Description of the Related Art

Systems that include multiple interconnected computers or processors have become fairly common. In such systems, the work of computing is divided between the computers or processors of the system. One example is a network or cluster in which one computer operates while another is in standby mode. The computer in standby mode can take over the work if the operating computer fails. Another example is a system of interconnected or clustered computers that performs large database searches. Each computer performs a different part of the search.

In interconnected or clustered systems, it is necessary that each computer have access to buffer memory that contains various system data. Typical existing solutions employ standard peripheral component interconnect (PCI) adapters with Input/Output (I/O)-based memory. These purely add on adapters require additional onboard RAM, thus increasing cost, and they suffer the performance degradation associated with I/O-based memory. It is an object of the present invention to provide an improved buffer memory system for interconnected or clustered computer systems.

The present invention provides a computer system with a shared-buffer memory. The computer system includes a plurality of interconnected host systems. Each of the host systems includes system random access memory, with a portion of the system random access memory being defined as shared-buffer memory. A system memory controller is operably connected to the system random access memory to determine, among other things, if the host has updated the shared-buffer memory, and if so, to signal that the shared-buffer memory has been updated. A buffer control and interconnect device is operably connected to the system memory controller. In response to a signal from the system memory controller that the shared-buffer memory has been updated, the buffer control and interconnect device reads the update from the shared-buffer memory and exports the update. The exported update is received at the buffer control and interconnect device of each of the other host systems. The receiving buffer control and interconnect device writes the update to its shared-buffer memory.

DESCRIPTION OF THE DRAWINGS

FIG. 1 is a block diagram of a system of interconnected host systems.

FIG. 2 is a block diagram of an integrated shared-buffer memory device according to the present invention.

DETAILED DESCRIPTION OF THE PREFERRED EMBODIMENT

Figure 3:
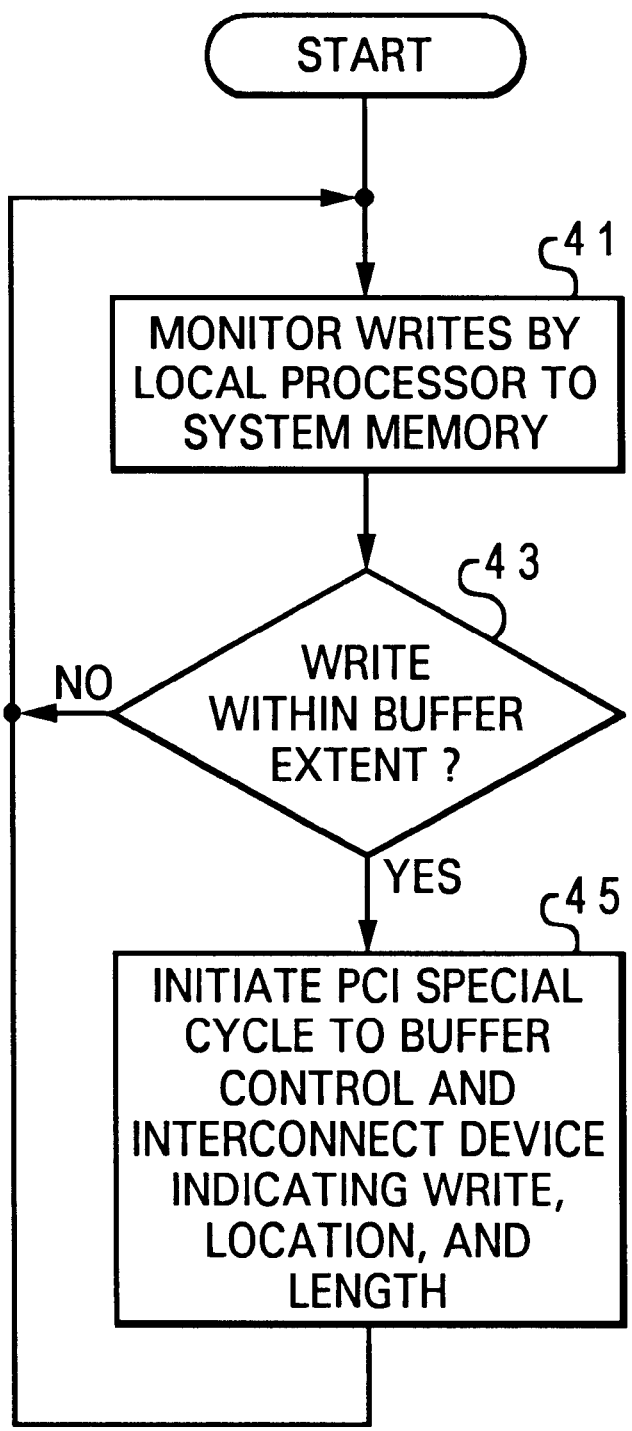
FIG. 3 is a flow chart of buffer logic processing according to the present invention.

Referring now to the drawings, in FIG. 1, a system of interconnected hosts is designated generally by the numeral 11. System I 1 includes a plurality of host computers or processors 13 interconnected by transmission medium, indicated generally at 15. Each host 13 includes one or more central processing units (CPUs) and system random access memory (RAM), as well as other standard input/output devices, as is well known to those skilled in the art. Transmission medium 15 may be optical fiber or any other industry standard medium. Communication between hosts over transmission medium 15 is preferably done with any of several industry standard protocols.

According to the present invention, each host maintains a shared buffer memory in its system RAM. The present invention provides a method and system for maintaining the same data in each shared buffer memory. Referring now to FIG. 2, there is shown a block diagram of a shared buffer memory apparatus, designated generally by the numeral 17, which is included in each host 13. The system RAM of the host is indicated at 19. A portion of RAM 19 is established as a buffer 21 by the operating system host 13 or other software. Buffer 21 is defined by a buffer start and extent within the overall system RAM 19. Each page within buffer 21 must be marked as write through, which means that when the processor of host 13 performs a memory write to an address within the buffer, the data must actually be written to the buffer RAM. Preferably, buffer RAM 21 is contiguous in order to avoid scatter/gather overhead.

Integrated shared buffer memory apparatus 17 includes a system memory controller (MC) and primary host bridge (PHB) 23. MC/PHB is operably connected to the processor or CUP (not shown) of host 13 by a local bus 25. According to the present invention, MC/PHB 23 includes buffer logic 27. Buffer logic 27 performs three main functions. The first main function performed by buffer logic 27 is to define the shared RAM buffer start and extent within the overall system RAM. The second function performed by buffer logic 27 is to monitor RAM 19 to determine when the processor has updated the buffer RAM 21. The third function performed by buffer logic 27 is to generate a signal, which in the preferred embodiment is a PCI Special Cycle, which indicates the location and length within RAM 19 of an update written to buffer 21.

The PCI Special Cycle is preferably encoded and defined in accordance with the PCI Specification. As is well known in the art, a PCI Special Cycle is a simple broadcast message mechanism in the industry standard PCI. The PCI Special Cycle is designed to be an alternative to physical signals when side band communication is necessary.

Integrated shared buffer memory apparatus 17 includes a system memory controller (MC) and primary host bridge (PHB) 23. MC/PHB is operably connected to the processor or CUP (not shown) of host 13 by a local bus 25. According to the present invention, MC/PHB 23 includes buffer logic 27. Buffer logic 27 performs three main functions. The first main function performed by buffer logic 27 is to define the shared RAM buffer start and extent within the overall system RAM. The second function performed by buffer logic 27 is to monitor RAM 19 to determine when the processor has updated the buffer RAM 21. The third function performed by buffer logic 27 is to generate a signal, which in the preferred embodiment is a PCI Special Cycle, which indicates the location and length within RAM 19 of an update written to buffer 21.

When a host 13 is set up as a node of system 11, the buffer logic 27 of its MC/PHB 23 is programmed with the buffer RAM starting location and extent. In FIG. 2, the address 0 of buffer RAM 21 is based at address s of RAM 21. Defining the buffer RAM area enables the buffer logic 27 to detect local processor updates. The host side buffer control 33 is programmed with the base address s of RAM buffer 21. In the preferred embodiment, buffer 21 is managed on a zero-based reference so that the actual buffer may float within each host. Thus, host-side buffer control 33 adds base address s to any zero-based reference in buffer RAM 21.

Figure 4:
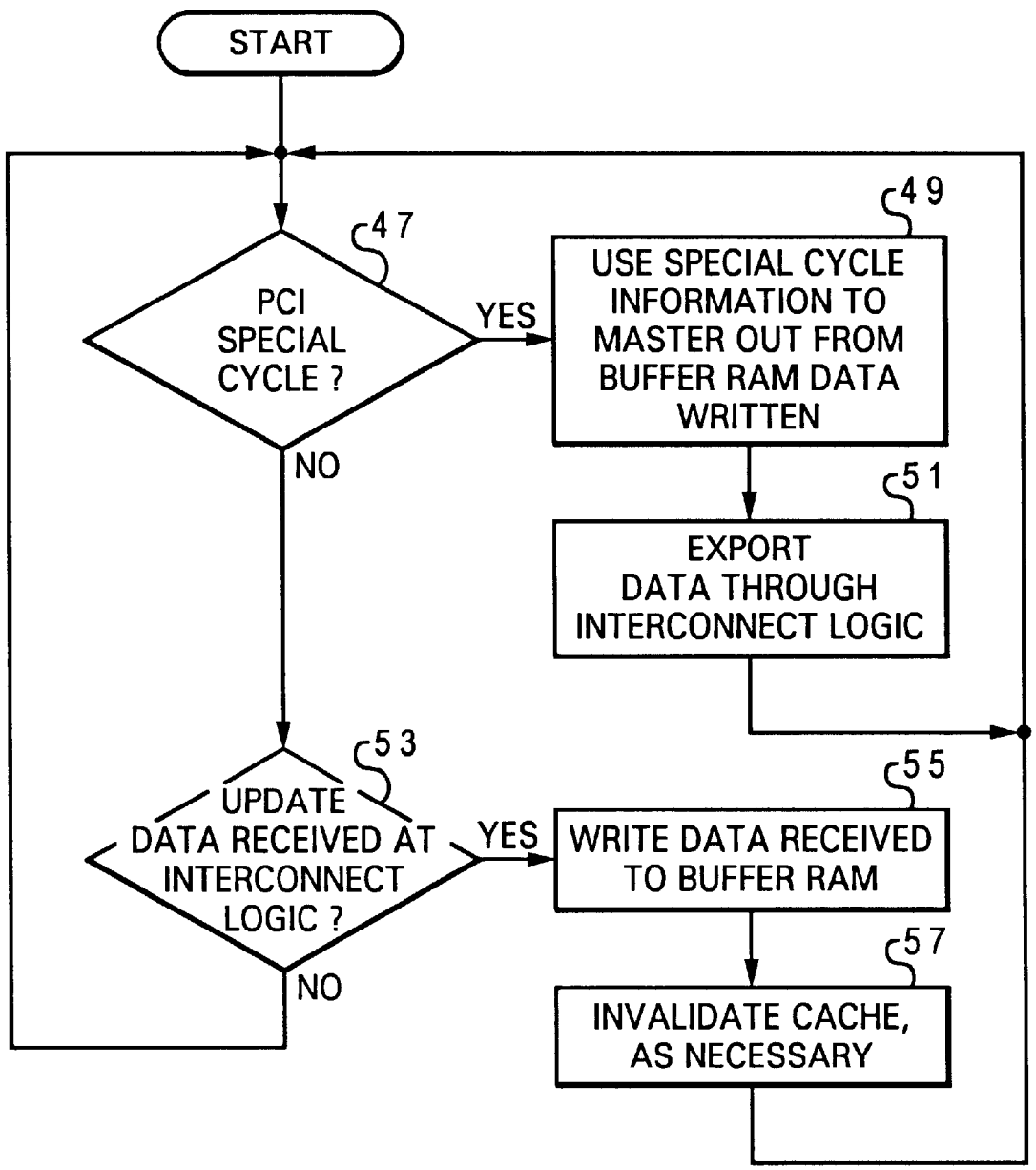
FIG. 4 is a flow chart of host-side buffer control and interconnect logic processing according to the present invention.

The operation of the present invention is illustrated with reference to FIGS. 3 and 4. FIG. 3 is a high level flow chart of processing performed by buffer logic 27. FIG. 4 is a high level flow chart of processing performed by buffer control and interconnect device 29. Referring to FIG. 3, MC/PHB 23 monitors writes by the local processor to system memory, at block 41. If, at decision block 43, the MC/PHB detects a write within the buffer extent, the MC/PHB initiates a PCI Special Cycle to buffer control and interconnect device indicating the write, location and length, at block 45.

Referring to FIG. 4, which illustrates processing performed by the buffer control and interconnect device 29, if, at decision block 47, the BCID receives a PCI Special Cycle, the BCID uses the Special Cycle information to master out from buffer RAM the updated data, at block 49.

If, at decision block 53, update data is received at interconnect logic, the host side buffer control of the BCID, acting as a PCI master, performs a write of the received data to the buffer RAM, as indicated at block 55. In the event no update data is received at the interconnect logic at block 55 the process returns to block 47 in an iterative fashion. In the preferred embodiment, standard snooping invalidates the line or lines of written data in any cache, as indicated at block 57. The next local host read of the updated area comes from the buffer RAM.

From the foregoing, it may be seen that the present invention provides a shared-buffer memory arrangement that overcomes the shortcomings associated with standard peripheral component interconnect (PCI) adapters with I/O-based memory. The use of system RAM for the buffer eliminates both the cost of additional RAM on the adapter and the performance degradation associated with I/O-based memory. While the present invention has been particularly shown and described with reference to a presently preferred embodiment, those skilled in the art will recognize that various changes in form and detail may be made without departing from the spirit and scope of the invention.

What is claimed is:

1. An integrated shared-buffer memory device in a host, which comprises:

system memory, said system memory including a shared-buffer memory;

a system memory controller operably connected to said system memory, said system memory controller determining if said host has updated said shared-buffer memory and signaling that said shared-buffer memory has been updated; and a buffer control and interconnect device operably connected to said system memory controller, said buffer control and interconnect device reading data from said shared-buffer memory in response to a signal from said system memory controller that said shared-buffer memory has been updated.

2. The integrated shared-buffer memory device as claimed in claim 1, wherein:

said system memory controller includes buffer logic.

3. The integrated shared-buffer memory device as claimed in claim 1, wherein:

said buffer control and interconnect device includes buffer control.

4. The integrated shared-buffer memory device as claimed in claim 1, wherein said buffer control and interconnect device includes:

means for exporting said data read from said shared buffer memory.

5. The integrated shared-buffer memory device as claimed in claim 4, wherein:

said means for exporting said data read from said shared-buffer memory includes interconnect logic.

6. The integrated shared-buffer memory device as claimed in claim 1, wherein said system memory controller is operably connected to said buffer control and interconnect device through a Peripheral Component Interconnect (PCI) bus.

7. The integrated shared-buffer memory device as claimed in claim 6, wherein:

said system memory controller signaling that said shared-buffer memory has been updated includes means for initiating a PCI Special Cycle.

8. The integrated shared-buffer memory device as claimed in claim 1, wherein said shared-buffer memory is an area defined by a location and extent in said system memory.

9. The integrated shared-buffer memory device as claimed in claim 8, wherein said system memory controller determining if said host has updated said shared-buffer memory includes buffer logic for determining if said host has written to a system memory location within said area.

10. A computer system, which comprises:

a plurality of interconnected hosts, each of said hosts including:

system memory, said system memory including a shared-buffer memory;

a system memory controller operably connected to said system memory, said system memory controller determining if said host has updated said shared-buffer memory and signaling that said shared-buffer memory has been updated; and a buffer control and interconnect device operably connected to said system memory controller, said buffer control and interconnect device reading data from said shared-buffer memory in response to a signal from said system memory controller that said shared-buffer memory has been updated.

11. The computer system as claimed in claim 10, wherein:

said system memory controller includes buffer logic.

12. The computer system as claimed in claim 10, wherein:

said buffer control and interconnect device includes buffer control.

13. The computer system as claimed in claim 10, wherein said buffer control and interconnect device includes:

means for exporting said data read from said shared buffer memory.

14. The computer system as claimed in claim 13, wherein:

said means for exporting said data read from said shared-buffer memory includes interconnect logic.

15. The computer system as claimed in claim 10, wherein said system memory controller is operably connected to said buffer control and interconnect device through a Peripheral Component Interconnect (PCI) bus.

16. The computer system as claimed in claim 15, wherein said means for signaling that said shared-buffer memory has been updated includes means for initiating a PCI Special Cycle.

17. The computer system as claimed in claim 10, wherein said shared-buffer memory is an area defined by a location and extent in said system memory.

18. The computer system as claimed in claim 17, wherein said system memory controller includes buffer logic for determining if said host has written to a system memory location within said area.

19. A computer system, which comprises:
   a plurality of interconnected host systems, each of said host systems including a shared-buffer memory defined within system random access memory;
   means for detecting an update by one of said host systems of its shared-buffer memory; and,
   means for updating the shared-buffer memories of each of the other host systems in response to the detecting of said update.

20. The computer system as claimed in claim 19, wherein said means for detecting an update by said one of said host systems includes:
   a system memory controller operably connected to the system memory of said one of said host systems.

21. The computer system as claimed in claim 20, said means for updating the shared-buffer memories of each of the other host systems includes a buffer control and interconnect device operably connected to said system memory controller.

22. The computer system as claimed in claim 21, wherein said means for updating the shared-buffer memories of each of said other host systems includes:
   means in said buffer control and interconnect device of each of said other host systems for writing, to the shared-buffer memory of each said host, update data received at said buffer control and interconnect device.

23. A method of maintaining a shared-buffer memory in a group of interconnected hosts, which comprises the steps of:
   establishing a buffer memory in system memory of each host;
   detecting an update to a buffer memory by one of said hosts;
   transmitting said update to the other of said hosts; and
   updating the buffer memories of the other of said hosts with the transmitted update.

\* \* \* \* \*